US009778960B2

United States Patent
Berlin et al.

(10) Patent No.: US 9,778,960 B2
(45) Date of Patent: Oct. 3, 2017

(54) THERMAL PRIORITIZED COMPUTING APPLICATION SCHEDULING

(75) Inventors: Kimon Berlin, Ft Collins, CO (US);
Tom Fisher, Carbondale, CO (US);
Raphael Gay, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 58 days.

(21) Appl. No.: 14/390,423

(22) PCT Filed: Jun. 29, 2012

(86) PCT No.: PCT/US2012/044934
§ 371 (c)(1),
(2), (4) Date: Oct. 3, 2014

(87) PCT Pub. No.: WO2014/003785
PCT Pub. Date: Jan. 3, 2014

(65) Prior Publication Data
US 2015/0067692 A1     Mar. 5, 2015

(51) Int. Cl.
*G06F 9/50* (2006.01)
*G06F 1/20* (2006.01)
(Continued)

(52) U.S. Cl.
CPC ........... *G06F 9/5094* (2013.01); *G06F 1/206* (2013.01); *G06F 1/3206* (2013.01); *G06F 1/329* (2013.01); *G06F 9/4856* (2013.01); *G06F 9/5038* (2013.01); *Y02B 60/142* (2013.01); *Y02B 60/144* (2013.01)

(58) Field of Classification Search
None
See application file for complete search history.

(56) References Cited

U.S. PATENT DOCUMENTS 6,006,168 A * 12/1999 Schumann ............. G01K 17/00
                                                            374/134
7,716,006 B2   5/2010 Coskun et al.
(Continued)

FOREIGN PATENT DOCUMENTS

CN     1938687      3/2007
CN     101436155    5/2009
(Continued)

OTHER PUBLICATIONS

Christiana Ioannou et al., "Thermal Aware Multi-Core Scheduler," 2007, pp. 1-4, Available at: <www2.cs.ucy.ac.cy/carch/xi/posters/poster_tams_acaces2007.pdf>.
(Continued)

*Primary Examiner* — Lewis A Bullock, Jr.
*Assistant Examiner* — Bruce S Ashley
(74) *Attorney, Agent, or Firm* — HP Inc. Patent Department (57) ABSTRACT

Implementations disclosed herein relate to thermal based prioritized computing application scheduling. For example, a processor may determine a prioritized computing application. The processor may schedule the prioritized computing application to transfer execution from a first processing unit to a second processing unit based on a thermal reserve energy associated with the second processing unit.

17 Claims, 4 Drawing Sheets

(51) Int. Cl.
*G06F 1/32* (2006.01)
*G06F 9/48* (2006.01)

(56) References Cited

U.S. PATENT DOCUMENTS

| | | | |
|---|---|---|---|
| 7,886,172 B2* | 2/2011 | Bose | G06F 1/206 |
| | | | 713/300 |
| 8,397,088 B1* | 3/2013 | Ghose | G06F 1/206 |
| | | | 713/300 |
| 8,762,097 B2* | 6/2014 | Millet | G06F 1/206 |
| | | | 374/100 |
| 2006/0136074 A1 | 6/2006 | Arai et al. | |
| 2007/0074071 A1* | 3/2007 | Rothman | G06F 9/5088 |
| | | | 714/10 |
| 2008/0115010 A1* | 5/2008 | Rothman | G06F 1/206 |
| | | | 714/10 |
| 2009/0064164 A1 | 3/2009 | Bose et al. | |
| 2009/0089792 A1 | 4/2009 | Johnson et al. | |
| 2009/0100437 A1* | 4/2009 | Coskun | G06F 9/5027 |
| | | | 718/105 |
| 2010/0191993 A1* | 7/2010 | Chaudhry | G06F 1/206 |
| | | | 713/322 |
| 2010/0257531 A1 | 10/2010 | Barsness | |
| 2011/0138395 A1 | 6/2011 | Wolfe | |
| 2011/0271283 A1 | 11/2011 | Bell, Jr. et al. | |
| 2012/0146708 A1* | 6/2012 | Naffziger | G06F 1/206 |
| | | | 327/512 |
| 2012/0324250 A1* | 12/2012 | Chakraborty | G06F 1/206 |
| | | | 713/300 |

FOREIGN PATENT DOCUMENTS

| | | |
|---|---|---|
| JP | 2002-202893 A | 7/2002 |
| JP | 2005-285123 A | 10/2005 |

OTHER PUBLICATIONS

International Search Report and Written Opinion, International Application No. PCT/US2012/044934, dated Jan. 31, 2013, pp. 1-10.

* cited by examiner

THERMAL PRIORITIZED COMPUTING APPLICATION SCHEDULING

BACKGROUND

Multiple computing applications may simultaneously execute on a multi-core processor or on separate processors in a computing system. An operating system may schedule the computing applications according to system resources.

BRIEF DESCRIPTION OF THE DRAWINGS

The drawings describe example embodiments. The following detailed description references the drawings, wherein.

DETAILED DESCRIPTION

A computing system may include multiple processing units, such as multiple cores in a multi-core processor or separate processors, and a prioritized computing application may be moved among the processing units based on thermal energy reserve levels associated with the processing units. The prioritized computing application may be, for example, a computing application using more system resources, a higher profile computing application, or a computing application more important to system users. The prioritized computing application may be moved from a first processing unit to a second processing unit to provide the prioritized computing application with additional processing power compared to other computing applications executing with the computing system.

The processing units in the computing system may accumulate a thermal energy reserve level above the thermal design of the processing units. The prioritized computing application may execute on a processing unit with a thermal energy reserve until the thermal reserve energy is spent. During that time, the other processing units may build their level of thermal energy reserve. For example, a processing unit executing at a level generating a low thermal power due to a lighter load may be building a thermal energy reserve. The thermal energy reserve levels of the other processing units may be analyzed, and the prioritized computing application may then be moved to a second processing unit based on the analysis of the thermal energy reserve levels. The processing unit previously executing the prioritized computing application may build up its thermal energy reserve while the prioritized computing application executes on a different processing unit such that the prioritized computing application may return to a previous processing unit when the thermal energy reserve level of that processing unit is built back up. The prioritized computing application may be scheduled to move from one processing unit to another processing unit to provide greater performance compared to the other computing applications executing within the computing system.

Figure 1:
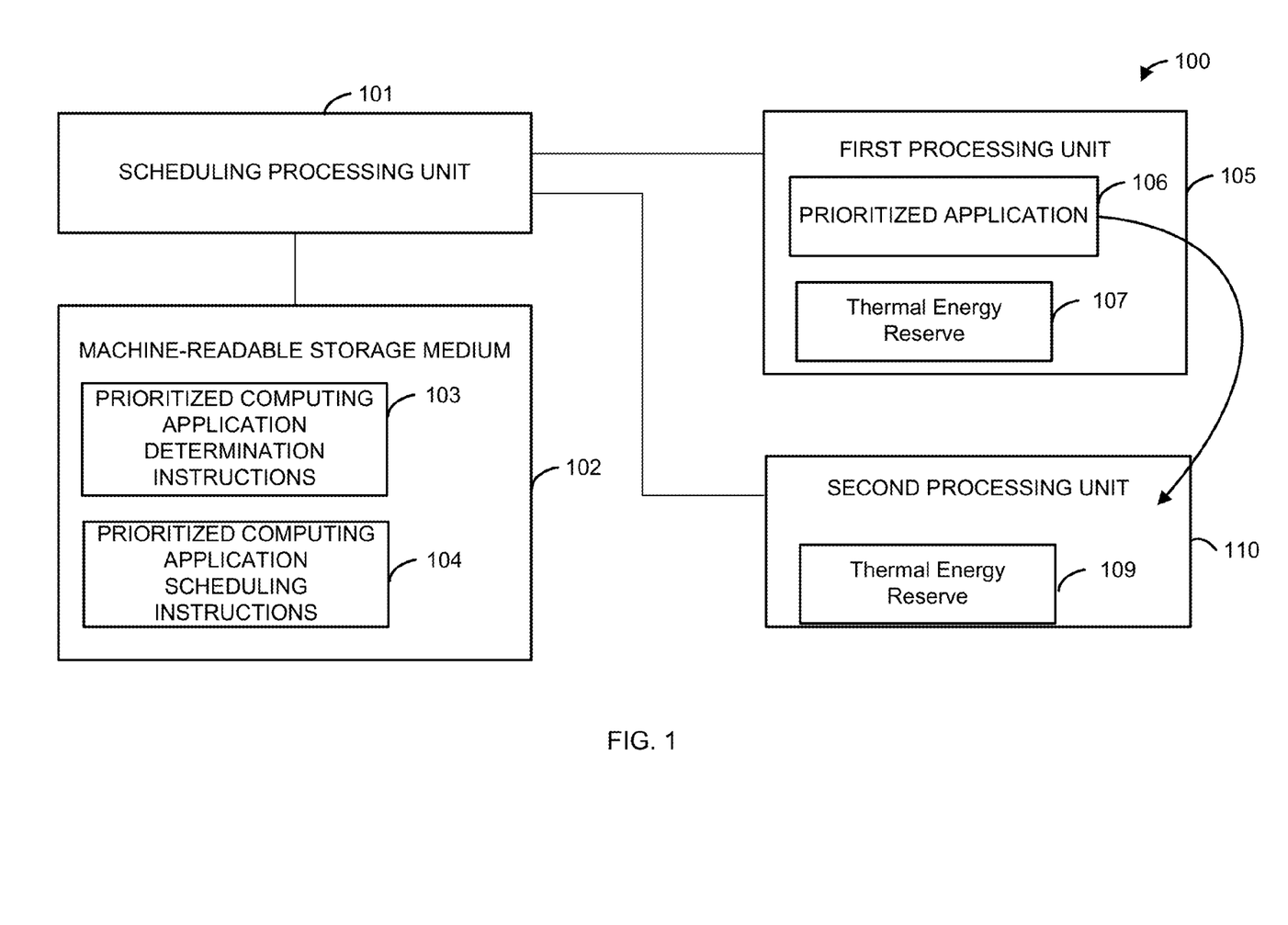
FIG. 1 is a block diagram illustrating one example of a computing system to schedule a prioritized computing application based on a thermal energy reserve.

FIG. 1 is a block diagram illustrating one example of a computing system 100 to schedule a prioritized computing application based on a thermal energy reserve. The computing system 100 may schedule computing applications among multiple processing units for execution. The computing system 100 may include multiple processing units, such as a scheduling processing unit 101, a first processing unit 105, and a second processing unit 110. The scheduling processing unit 101 may schedule a prioritized computing application 106 between processing units based on a thermal energy reserve associated with the processing units. The prioritized computing application 106 may be scheduled in a manner that the prioritized computing application 106 executes with greater performance compared to other computing applications executing on the computing system 100, in some cases allowing the prioritized computing application 106 to finish executing sooner.

The scheduling processing unit 101 may be a processor, such as a central processing unit (CPU), a semiconductor-based microprocessor, or any other device suitable for retrieval and execution of instructions. The scheduling processing unit 101 may be, for example, a processing core, and the computing system 100 may be a multi-core processor. In one implementation, the scheduling processing unit 101 includes logic instead of or in addition to a processor. As an alternative or in addition to fetching, decoding, and executing instructions, the scheduling processing unit 101 may include one or more integrated circuits (ICs) or other electronic circuits that comprise a plurality of electronic components for performing the functionality described below. In one implementation, the functionality performed by the scheduling processing unit 101 may be divided between multiple processors or processing cores.

The first processing unit 105 and the second processing unit 110 may be, for example, separate processors or separate processing cores in a multi-core processor. The computing system 100 may include multiple multi-core processors. The scheduling processing unit 101 may be a separate processing unit for scheduling or may be a processing unit that executes the prioritized computing application 106. The computing system 100 may include two processing units where the functionality of the scheduling processing unit 101 may be included in the first processing unit 105 or the second processing unit 110.

The scheduling processing unit 101 may communicate with a machine-readable storage medium 102, such as directly or via a network. The machine-readable storage medium 102 may be any suitable machine readable medium, such as an electronic, magnetic, optical, or other physical storage device that stores executable instructions or other data (e.g., a hard disk drive, random access memory, flash memory, etc.). The machine-readable storage medium 102 may be, for example, a computer readable non-transitory medium. In some implementations, the first processing unit 105 and the second processing unit 110 also communicate with the machine-readable storage medium 102. In one implementation, instructions related to the prioritized computing application 106 are stored in the machine-readable storage medium 102.

The machine-readable storage medium 102 may include instructions executable by the scheduling processing unit 101. The machine-readable storage medium 102 may include prioritized computing application determination instructions 103 and prioritized computing application scheduling instructions 104. The prioritized computing application determination instructions 103 may be instructions for identifying the prioritized computing application 106 executing within the computing system 100. The prioritized computing application determination instructions 103 may include instructions for identifying the prioritized computing application 106 automatically or based on user input. The prioritized computing application scheduling instructions 104 include instructions for moving the prioritized computing application 106 between processing units based on thermal energy reserve levels associated with the processing units.

The computing system 100 may include processing units capable of short term power spikes beyond their rated power. For example, the first processing unit 105 may build a thermal energy reserve 107 when executing at a level generating a lower thermal power due to a light load, and the first processing unit 105 may then run at a higher thermal power generation level until the reserve is spent. The scheduling processing unit 101 may move the prioritized computing application 106 from the first processing unit 105 to the second processing unit 110 when the thermal energy reserve 107 of the first processing unit 105 is spent.

The scheduling processing unit 101 may determine where and when to move the prioritized computing application 106, for example, by executing the prioritized computing application scheduling instructions 104. The scheduling processing unit 101 may model the rate at which a thermal energy reserve is accumulated and spent at each processing unit in the computing system 100 based on the instructions associated with computing applications executing on the processing units. For example, each instruction executed on a processing unit may be associated with an amount of thermal energy spent. In some implementations, the amount of thermal energy spent may be based on the characteristics of the particular processing unit, the type of instruction executing, or the type of computing application executing.

The scheduling processing unit 101 may select a processing unit to execute the prioritized computing application 106 based on an evaluation of the thermal energy reserve associated with the processing units. For example, the prioritized computing application 106 may be moved to a processing unit with a thermal energy reserve above a threshold or to a processing unit with the maximum thermal energy reserve compared to other processing units in the computing system 100. In some implementations, other factors may be considered in addition to the thermal energy reserve of the processing units.

The second processing unit 110 may be selected for the prioritized computing application 106 based on the thermal energy reserve 109 of the second processing unit 110. The scheduling processing unit 101 may move the prioritized computing application 106 executing on the second processing unit 110 to a different processing unit after the thermal energy reserve 109 of the second processing unit 110 is spent. The scheduling processing unit 101 may continue to move the prioritized computing application 106 between processing units until the prioritized computing application 106 finishes executing. In one implementation, the scheduling processing unit 101 may identify a new prioritized computing application, and the prioritized computing application 106 may no longer be moved to processing units with a higher thermal energy reserve.

Figure 2:
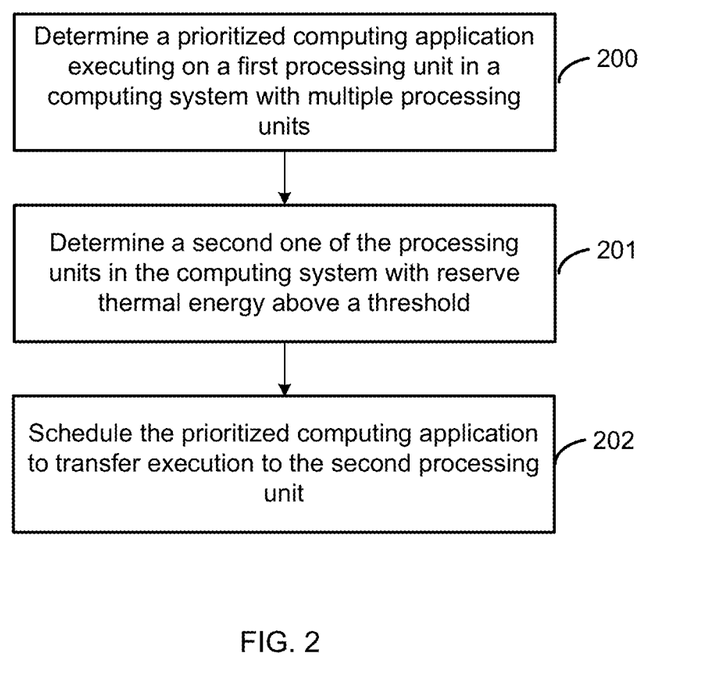
FIG. 2 is a flow chart illustrating one example of a method to schedule a prioritized computing application based on thermal energy reserve.

FIG. 2 is a flow chart illustrating one example of a method to schedule a prioritized computing application based on thermal energy reserve. A processor, such as the scheduling processing unit 101 of FIG. 1, may determine how to schedule the prioritized computing application. The prioritized computing application may be, for example, a single threaded application or a prioritized dominant thread of a multi-threaded application. The prioritized computing application may be scheduled between multiple processing units, such as between multiple separate processor or multiple processing cores, in a manner that may allow the prioritized computing application to receive more processing power than other computing applications executing within the computing system. The multiple processing units may be, for example, the processing units 105 and 110 from FIG. 1.

Beginning at 200, a scheduling processing unit, such as the scheduling processing unit 101, determines a prioritized computing application executing on a first processing unit in a computing system with multiple processing units. The scheduling processing unit may be associated with one of the processing units available for executing the prioritized computing application or may be separate from the processing units available for executing the prioritized computing application. Multiple computing applications may be executing within the computing system, and a prioritized computing application may be identified by the processor.

The prioritized computing application may be determined based on user input or automatically. A user may identify the prioritized computing application, such as where a user prefers that the prioritized computing application be provided with additional computing resources for faster performance. In one implementation, the user may provide information about computing applications or performance goals related to the computing applications executing on the computing system, and the processor determines the prioritized computing application based on the provided information. The prioritized information may be automatically determined based on an analysis of the computing applications executing within the computing system. For example, the load of the computing applications may be checked periodically, and the application with the highest load or highest average load may be identified as the prioritized computing application. The prioritized computing application may be automatically determined, and a user may provide a confirmation that the automatically selected computing application should be prioritized. The computing application may be, for example, a single threaded application or a multi-threaded application with a dominant thread.

Continuing to 201, the scheduling processing unit determines a second one of the processing units in the computing system with reserve thermal energy above a threshold. The scheduling processing unit may compare a thermal energy reserve level of the processing units within the computing system, and select a processor based on the thermal energy reserve levels associated with the processing units. In one implementation, the processor selects the processing unit with the highest thermal energy reserve. The scheduling processing unit may determine the processing units with a thermal energy reserve above a threshold and select one of the determined processing units. The processor may use additional criteria to select one of the determined processing units, such as based on location or other factors. The scheduling processing unit may determine the reserve thermal energy associated with the processing units, may receive the information from another device, or may retrieve the information from a storage. In some implementations, a subset of the processing units in the computing system is capable of accumulating a thermal energy reserve, and the thermal energy reserve is not computed for the other processing units.

Other considerations in addition to the thermal energy reserve level may be taken into account when determining the processing unit. For example, the location of the processing units may be considered such that the prioritized computing application is moved to a processing unit at a particular distance from the current processing unit executing the prioritized computing application.

The scheduling processing unit or another processor may determine the thermal energy reserve level of the processing units in the computing system in any suitable manner. For example, the scheduling processing unit may model the rate of thermal energy reserve accumulation and determine the thermal energy reserve level based on the modeled rate of the thermal energy generation and spending. A computing application executing on a processing unit may cause the processing unit to execute instructions, and an amount of thermal energy use may be associated with each instruction. The rate of thermal energy accumulation may be determined, and the thermal energy spent on the instructions may be subtracted from the thermal energy accumulated over a period of time to determine the thermal energy reserve level.

In one implementation, the scheduling processing unit models the rate of thermal energy reserve accumulation and use based on a programmable time constant indicating the thermal capacitance of the computing system. The time constant may be, for example, a weighting factor in a weighted moving average. In one implementation, the time constant is a weighting factor in an exponentially weighted moving average (EWMA). The time constant may be set to a smaller level, indicating a smaller system thermal capacitance such that thermal energy reserve is more quickly accumulated and spent. The time constant may be set to a higher value such that the thermal energy reserve is accumulated and spent slowly. Spending the thermal energy reserve more slowly may allow for a prioritized computing application to remain on a processing unit with a thermal energy reserve longer and to move between processing units less often.

The scheduling processing unit or another processor may automatically determine the value of the thermal capacitance time constant. In one implementation, the time constant is automatically determined based on an analysis of how often the prioritized computing application would move or how often a processing unit would accumulate a thermal energy reserve above a threshold. The thermal capacitance time constant may be set by a user or may be set at an unchanged rate. For example, the time constant may be a Basic Input Output System (BIOS) setting with a default value that may be altered by a user.

In one implementation, the computing system is a multi-core processor where the processing units are individual cores that may acquire a thermal energy reserve. The multi-core processor may allow an individual core to run at a higher thermal power generation level for a period of time and then to reconstitute its thermal energy reserve. The multi-core processor may have a programmable variable for the rate at which reserve thermal energy is acquired and spent. For example, the rate may be determined and stored in a machine-specific register such that processing cores may read the value. In one implementation, the rate for accumulating and spending reserve thermal energy may be based on a time constant indicating the thermal capacitance of the system. The time thermal capacitance factor may be set at a high value, and in some cases the highest possible value for the multi-core processor, such that the reserve is spent more slowly, resulting in fewer moves between processing units for the prioritized computing application. In one implementation, the computing system involves separate processors, and the capacitance of the system and rate of thermal energy reserve accumulation may be modeled in a manner discussed below in relation to FIG. 3.

In one implementation, the modeling of the thermal energy reserve may be further based on a temperature associated with the processing units. For example, a processing unit or group of processing units may have an associated thermal probe. If the temperature of a processing unit is above a particular level, the modeled thermal energy reserve of the processing unit may be revised, and in some cases, lowered, based on the information from the temperature probe.

In one implementation, the scheduling processing unit may determine a reserve thermal energy level for a processing unit and store it for later use. For example, the reserve information may be stored in a machine-specific register (MSR). The scheduling processing unit may access the stored information to update the reserve thermal energy level based on additional reserve thermal energy accumulated after a period of time or based on an amount of thermal energy spent executing a computing application. The scheduling processing unit may access the stored information to compare the reserve thermal energy level of multiple processing units in the computing system. In some implementations, the information may be stored by the individual processing unit or a separate processing unit rather than the scheduling processing unit.

In one implementation, the prioritized computing application may proceed in a particular order among the processing units in the computing system in a manner determined to move the prioritized computing application to a processing unit with adequate reserve thermal energy. The order may move the prioritized computing application a particular distance from the current processing unit executing the prioritized computing application to create better thermal dissipation. The order may be based on the IDs of the processing units or processing cores, such as where the layout of the computing system is unknown to the scheduling processing unit. The scheduling processing unit may determine the order and the amount of time between switching processing units based on a determination of the likely amount of time for a processing unit to build up its thermal energy reserve and the likely amount of time for a processing unit executing the prioritized computing application to spend its thermal energy reserve.

In one implementation, the scheduling processing unit determines whether to move the prioritized computing application. For example, if the load on the computing system is above a threshold, the processing units may not be capable of accumulating enough reserve thermal energy to compensate for the performance decrease caused by continuously moving the prioritized computing application to different processing units. The scheduling processing unit may move the prioritized computing application for a period of time and then allow the prioritized computing application to execute normally until determined that the computing system load is light enough to allow for sufficient reserve thermal energy to be built up.

Proceeding to 202, the scheduling processing unit schedules the prioritized computing application to transfer execution to the second processing unit. If a computing application was executing on the second processing unit, the computing application may be moved to the first processing unit such that the prioritized computing application may be moved to the second processing unit. In one implementation, an operating system scheduler moves a computing application executing on the second processing unit to another processing unit. The operating system scheduler may move multiple computing applications around in the system or switch the computing application with another processing unit.

Cached data associated with the prioritized computing application may be moved to the second processing unit along with the prioritized computing application. The data may be cached to provide better performance for the prioritized computing application. In some cases, the processor may evaluate the amount of time to move the cached data or the size of the cached data to determine how often to move the prioritized computing application between processing units. For example, the processor may move the prioritized computing application less often where the time to move the cached data is greater such that it lessens the performance gain achieved by moving the prioritized computing application to processing units with greater reserve thermal energy.

Figure 3:
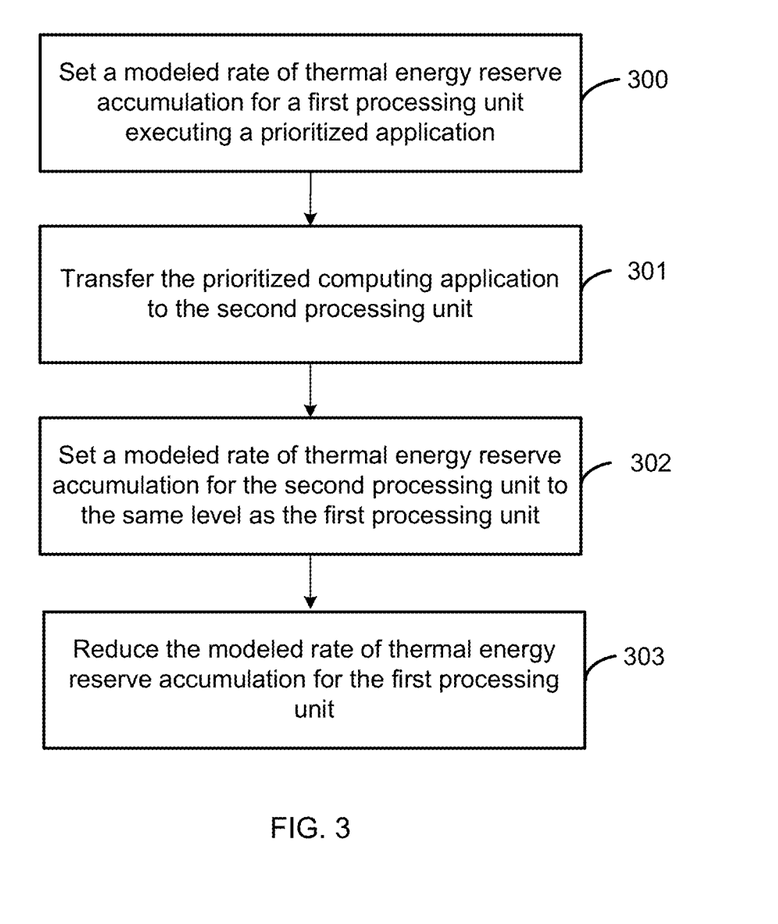
FIG. 3 is a flow chart illustrating one example of a method of modeling a rate of thermal energy reserve accumulation associated with a processing unit.

FIG. 3 is a flow chart illustrating one example of a method of modeling a rate of thermal energy reserve accumulation associated with a processing unit. A prioritized computing application may be moved between separate processors in a computing system. In some cases, the computing system may not include a feature for setting a thermal energy reserve time constant that may be available in some multi-core processors. A scheduling processing unit may model the level of thermal energy reserve of the separate processors within the computing system. The model may indicate how the thermal energy reserve is spent on the prioritized computing application and how the processing unit previously executing the prioritized computing application recovers from spending its thermal energy reserve to execute the prioritized computing application. The modeled thermal energy reserve levels may be used to determine when to move the prioritized computing application to another processing unit and which processing unit to move it to. The method may be implemented, for example, by the scheduling processing unit 101 in FIG. 1.

Beginning at 300, a scheduling processing unit sets a modeled rate of thermal energy reserve accumulation for a first processing unit executing a prioritized computing application. The rate of thermal energy reserve accumulation may be set to a lower level for the processing unit executing the prioritized computing application compared to other processing units in the computing system. The lower rate may model the thermal energy reserve headroom being spent slowly on the prioritized computing application such that the prioritized computing application may be moved less often.

The rate of thermal energy reserve accumulation may be based on a time constant associated with a modeled thermal capacitance. A higher modeled thermal capacitance may be associated with a slower rate of modeled thermal energy reserve accumulation and spending. The modeled thermal capacitance generation rate may be set to a higher level for the processing unit executing the prioritized computing application such that the reserve is spent more slowly and the prioritized computing application remains on the processing unit for a longer period of time. The prioritized computing application may be moved less often to lessen the performance decrease caused by moving the prioritized application and its cached data to a new processing unit.

Continuing to 301, the scheduling processing unit transfers the prioritized computing application to the second processing unit. For example, the scheduling processing unit may determine that the first processing unit spent its accumulated thermal energy reserve. The scheduling processing unit may determine the amount of thermal energy reserve of the second processing unit based on the rate of thermal energy reserve accumulation for the second processing unit and the amount of thermal energy spent by the second processing unit over a period of time. The amount of thermal energy spent by the second processing unit may be determined based on the instructions associated with the computing applications executing on the second processing unit.

Moving to 302, the scheduling processing unit sets a modeled rate of thermal energy reserve accumulation for the second processing unit to the same level as the first processing unit. For example, a similar time constant may be used to model the thermal energy reserve accumulation in the second processing unit as in the first processing unit when the prioritized application is transferred to the second processing unit. The time constant may indicate a higher thermal capacitance corresponding to a lower modeled rate of thermal energy reserve accumulation. The modeled rate of thermal energy reserve may be lower such that the reserve thermal energy is spent more slowly on the prioritized computing application.

Proceeding to 303, the scheduling processing unit reduces the modeled rate of thermal energy reserve accumulation for the first processing unit. When the prioritized computing application is moved to a different processing unit, the modeled rate of thermal energy reserve accumulation for the first processing unit may be modeled as the same level as the other processing units, which may be higher than the processing unit executing the prioritized computing application. The time constant for the model for the processing unit may be set to the same as the other processing units not executing the prioritized computing to model a lower thermal capacitance. In one implementation, the model involves more than two time constant levels and thermal energy reserve accumulation rates. For example, processing units not executing the prioritized computing application may be modeled using different time constants and different rates of thermal energy reserve accumulation.

The modeled rate of thermal energy reserve accumulation and the instructions executed on the first processing unit may be used to determine the level of thermal energy reserve associated with the first processing unit. The prioritized computing application may return to the first processing unit at a later time when determined that the first processing unit has a thermal energy reserve above a threshold.

Figure 4:
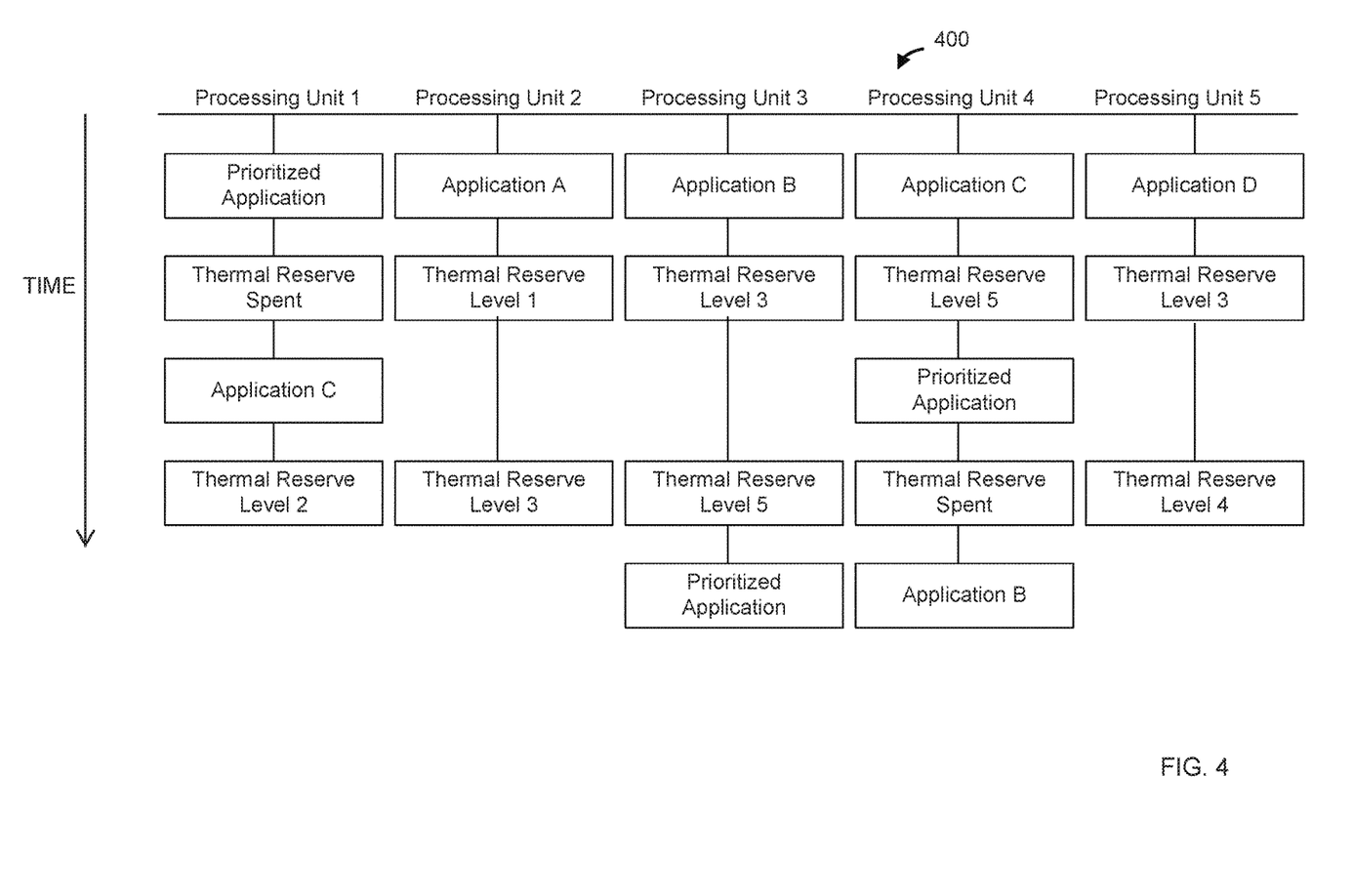
FIG. 4 is a diagram illustrating one example of scheduling a prioritized computing application within a computing system over time based on thermal reserve energy.

FIG. 4 is a diagram illustrating one example 400 of scheduling a prioritized computing application within a computing system over time based on thermal reserve energy. FIG. 4 shows five processing units executing a prioritized computing application and applications A, B, C, and D. For example, initially processing unit 1 executes the prioritized computing application and processing unit 2 executes application A. As the prioritized computing application is executing on processing unit 1, the other processing units may be able to execute the other applications while simultaneously building a reserve of thermal capacitance. The processing units may build a thermal capacitance reserve over time, for example, moving from a level 1 to a level 3 in the diagram.

The prioritized computing application may be moved off of processing unit 1 when the thermal reserve of processing unit 1 is spent from executing the prioritized computing application. In some implementations, the prioritized computing application may be moved from a processing unit after a particular time period or when a processing unit with reserve thermal energy above a threshold is identified or becomes available.

When the thermal reserve on processing unit 1 is spent, processing unit 2 has a thermal reserve level 1, processing unit 3 has a thermal reserve level 3, processing unit 4 has a thermal reserve level 5, and processing unit 5 has a thermal reserve level 3. The prioritized computing application may be moved to a processing unit with the greatest thermal reserve level, or for example, a thermal reserve level above a threshold of 4. The prioritized computing application is moved to processing unit 4, and application C previously executing on processing unit 4 is moved to processing unit 1.

Processing unit 4 spends its thermal reserve executing the prioritized computing application as the other four processing units acquire additional thermal reserve energy. When processing unit 4 finishes spending its reserve thermal energy, the reserve thermal energy of the other processing units is compared. The prioritized computing application may be moved to processing unit 3 with thermal reserve level 5, and application B executing on processing unit 3 may be moved to processing unit 4.

The invention claimed is:

1. A computing system, comprising:
   multiple processing units capable of building a reserve of thermal energy; and
   a machine-readable non-transitory storage medium comprising instructions executable on one of the processing units to:
   identify a prioritized computing application executing within the computing system;
   determine a reserve thermal energy level for each processing unit in the computing system, wherein the instructions to determine a reserve thermal energy level for each processing unit include instructions to:
   determine a modeled rated of reserve thermal energy accumulated computed from the type of instruction executed and a programmable time constant, wherein:
   the programmable time constant affects how quickly the reserve thermal energy is accumulated and spent; and
   the programmable time constant is selected to accumulate and spend the reserve thermal energy slowly;
   determine a frequency with which the prioritized computing application is to move;
   determine an amount of energy used to execute the prioritized computing application; and
   subtract the amount of energy used to execute the prioritized computing application from the modeled rate of reserve thermal energy to determine the reserve thermal energy level;
   determine a second one of the processing units in the computing system with a reserve thermal energy level above a threshold level of reserve thermal energy;
   determine that the reserve thermal energy level for the first processing unit has been exhausted; and
   transfer the prioritized computing application to the second processing unit based on the determination that the reserve thermal energy level for the first processing unit has been exhausted and the determination that the reserve thermal energy level for the second processing unit is above the threshold level.

2. The computing system of claim 1, wherein determining the prioritized computing application comprises determining the computing application with a higher load compared to other computing applications executing within the computing system.

3. The computing system of claim 2, wherein the first and second processing units comprise processing cores within a multi-core processor, and wherein the processing unit is further to set a factor of thermal energy reserve accumulation for the multi-core processor.

4. The computing system of claim 2, wherein the processing unit is further to set a thermal capacitance factor associated with a rate of model thermal energy reserve accumulation higher for the first processing unit executing the prioritized computing application compared to a thermal capacitance factor for the second processing unit.

5. The computing system of claim 2, wherein scheduling the prioritized computing application comprises:
   determining one of the processing units with reserve thermal energy above a threshold; and
   transferring the application to the determined processing unit.

6. A method, comprising:
   determining a prioritized computing application;
   executing the prioritized computing application on a first processing unit in a computing system with multiple processing units;
   determining a reserve thermal energy level for each processing unit, wherein determining a reserve thermal energy level for each processing unit includes:
   determining a modeled rate of reserve thermal energy accumulated computed from the type of instruction executed and a programmable time constant, wherein:
   the programmable time constant affects how quickly the reserve thermal energy is accumulated and spent; and
   the programmable time constant is selected to accumulate and spend the reserve thermal energy slowly;
   determining a frequency with which the prioritized computing application is to move;
   determining an amount of energy used to execute the prioritized computing application; and
   subtracting the amount of energy used to execute the prioritized computing application from the modeled rate of reserve thermal energy to determine the reserve thermal energy level;
   determining a second one of the processing units in the computing system with reserve thermal energy level above a threshold level of reserve thermal energy;
   determining that the reserve thermal energy level for the first processing unit has been exhausted; and
   transferring the prioritized computing application to the second processing unit based on the determination that the reserve thermal energy level for the first processing unit has been exhausted and the determination that the reserve thermal energy level for the second processing unit is above the threshold level.

7. The method of claim 1, wherein transferring of the prioritized computing application to a particular processing unit of the processing unit is determined by a scheduling process unit and is performed in a particular order using one of the following algorithms:
   moving the prioritized computing application in the order of a particular distance from the first processing unit;

moving the prioritized computing application based on the identities of the processing units, wherein the layout of the computing system is unknown to the scheduling processing unit; or moving the prioritized computing application in the order based on the amount of time for a processing unit to build up its thermal energy reserve and the likely amount of time for a processing unit executing the prioritized computing application to spend its thermal energy reserve.

8. The method of claim 1, further comprising:
determining a level of reserve thermal energy of the second one of the processing units based on the rate of reserve thermal energy accumulation and based on thermal energy spent by the second one of the processing units.

9. The method of claim 8, wherein determining the rate of thermal energy reserve accumulation comprises determining the rate based on a weighted moving average.

10. The method of claim 1, further comprising determining the prioritized computing application based on a load of the prioritized computing application.

11. The method of claim 1, further comprising:
setting a modeled rate of thermal energy reserve accumulation for a first processing unit;
setting a modeled rate of thermal energy reserve accumulation for the second processing unit, wherein the modeled rate of thermal energy reserve accumulation for the second processing unit is set to the same level as the first processing unit; and
reducing the modeled rate of thermal energy reserve accumulation for the first processing unit.

12. The method of claim 1, further comprising:
determining a third one of the processing units in the computing system with reserve thermal energy above a threshold; and
moving the prioritized computing application from the second processing unit to the third processing unit in response to a determination that the third processing unit has a reserve thermal energy above the threshold.

13. The method of claim 1, wherein the second processing unit has a maximum thermal energy reserve when compared to other processing units.

14. A machine-readable non-transitory storage medium comprising instructions executable by a processor to:
determine a prioritized computing application;
execute the prioritized computing application;
determine a reserve thermal energy level for each processing unit in a computing system with multiple processing units, wherein the instructions to determine a reserve thermal energy level include instructions to:
determine a modeled rated of reserve thermal energy accumulated computed from the type of instruction executed and a programmable time constant, wherein:
the programmable time constant affects how quickly the reserve thermal energy is accumulated and spent; and
the programmable time constant is selected to accumulate and spend the reserve thermal energy slowly;
determine a frequency with which the prioritized computing application is to move;
determine an amount of energy used to execute the prioritized computing application; and
subtract the amount of energy used to execute the prioritized computing application from the modeled rate of reserve thermal energy to determine the reserve thermal energy level;
determine a second one of the processing units in the computing system with a reserve thermal energy level above a threshold level of reserve thermal energy;
determine that the reserve thermal energy level for the first processing unit has been exhausted; and
transfer the prioritized computing application to the second processing unit based on the determination that the reserve thermal energy level for the first processing unit has been exhausted and the determination that the reserve thermal energy level for the second processing unit is above the threshold level.

15. The machine-readable non-transitory storage medium of claim 14, wherein the first and second processing units comprise separate processors, and further comprising instructions to set a thermal capacitance factor associated with a rate of model thermal energy reserve accumulation higher for the first processing unit executing the prioritized computing application compared to a thermal capacitance factor for the second processing unit.

16. The machine-readable non-transitory storage medium of claim 14, wherein the first and second processing units comprise processing cores within a multi-core processor, and further comprising instructions to set a factor of thermal energy reserve accumulation for the multi-core processor.

17. The machine-readable non-transitory storage medium of claim 14, wherein instruction to transfer execution from a first processing unit to a second processing unit comprise instructions to transfer cached data associated with the prioritized computing application from the first processing unit to the second processing unit.

* * * * *